United States Patent
He et al.

(10) Patent No.: US 9,380,075 B2
(45) Date of Patent: Jun. 28, 2016

(54) SYSTEM FOR SUPERVISING THE SECURITY OF AN ARCHITECTURE

(71) Applicant: ORANGE, Paris (FR)

(72) Inventors: Ruan He, Issy les Moulineaux (FR); Marc Lacoste, Versailles (FR); Aurélien Wailly, Suresnes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/389,191

(22) PCT Filed: Mar. 26, 2013

(86) PCT No.: PCT/FR2013/050648
§ 371 (c)(1),
(2) Date: Sep. 29, 2014

(87) PCT Pub. No.: WO2013/144497
PCT Pub. Date: Oct. 3, 2013

(65) Prior Publication Data
US 2015/0089572 A1    Mar. 26, 2015

(30) Foreign Application Priority Data
Mar. 29, 2012 (FR) ..................... 12 52876

(51) Int. Cl.
*G06F 17/00* (2006.01)
*H04L 29/06* (2006.01)

(52) U.S. Cl.
CPC ............ *H04L 63/20* (2013.01); *H04L 63/1416* (2013.01); *H04L 29/06* (2013.01); *H04L 63/14* (2013.01); *H04L 63/1408* (2013.01); *H04L 63/205* (2013.01)

(58) Field of Classification Search
CPC ....... H04L 63/20; H04L 63/205; H04L 63/14; H04L 63/1408; H04L 63/1416; H04L 29/06
USPC ............................................................. 726/1
See application file for complete search history.

(56) References Cited

U.S. PATENT DOCUMENTS 8,689,282 B1 *  4/2014  Oprea ..................... H04L 63/20
                                                        726/1
9,009,783 B2 *  4/2015  Bartholomay et al. ........... 726/1
(Continued)

FOREIGN PATENT DOCUMENTS

EP    2037657 A1    3/2009
EP    2372974 A1    10/2011

OTHER PUBLICATIONS

International Preliminary Report on Patentability and English translation of the Written Opinion dated Oct. 1, 2014 for corresponding International Application No. PCT/FR2013/050648, filed Mar. 26, 2013.

(Continued)

*Primary Examiner* — Jeffrey Pwu
*Assistant Examiner* — Jayesh Jhaveri
(74) *Attorney, Agent, or Firm* — David D. Brush; Westman Champlin & Koehler, P.A.

(57) ABSTRACT

A method is provided for supervising security of an architecture having a plurality of interconnected clouds. A cloud includes a plurality of resources and a security supervisor. The plurality of resources forms in the cloud a plurality of groups of resources associated respectively with a security domain. A security controller supervises the resources of the domain, and a plurality of physical machines contains the resources of the plurality of clouds. The method includes: receiving a security event by a security controller of a first cloud, originating from a first resource associated with a first security domain; dispatching said security event to the security supervisor of the first cloud; and dispatching by the security supervisor of the first cloud a security order in reaction to the security event to at least one second security controller of the first cloud and dispatching the security order by the second security controller to a second resource supervised by the second controller.

4 Claims, 3 Drawing Sheets

(56) References Cited

U.S. PATENT DOCUMENTS

| | | | |
|---|---|---|---|
| 2002/0053033 A1* | 5/2002 | Cooper | H04L 12/2602 726/7 |
| 2010/0082513 A1* | 4/2010 | Liu | 706/46 |
| 2010/0217850 A1* | 8/2010 | Ferris | H04L 63/20 709/223 |
| 2011/0072486 A1* | 3/2011 | Hadar et al. | 726/1 |
| 2011/0099602 A1* | 4/2011 | Apparao et al. | 726/1 |
| 2011/0173699 A1 | 7/2011 | Figlin et al. | |
| 2011/0247047 A1 | 10/2011 | Loureiro et al. | |
| 2012/0005724 A1* | 1/2012 | Lee | 726/1 |
| 2012/0203877 A1* | 8/2012 | Bartholomay | H04L 63/0227 709/221 |
| 2012/0222084 A1* | 8/2012 | Beaty | H04L 43/0817 726/1 |
| 2012/0304277 A1* | 11/2012 | Li | H04L 63/0218 726/12 |
| 2013/0097662 A1* | 4/2013 | Pearcy | G06F 21/577 726/1 |
| 2013/0104236 A1* | 4/2013 | Ray et al. | 726/25 |
| 2013/0160072 A1* | 6/2013 | Reus et al. | 726/1 |

OTHER PUBLICATIONS

International Search Report and Written Opinion dated Jul. 1, 2013 for corresponding International Application No. PCT/FR2013/050648, filed Mar. 26, 2013.

Sebastian Roschke et al., "Intrusion Detection in the Cloud" 2009 Eighth IEEE International Conference on Dependable, Automatic and Secure Computing, Dec. 1, 2009, pp. 729-734, XP055011860.

Amir Vahid Dastjerdi et al., "Distributed Intrusion Detection in Clouds Using Mobile Agents", Advanced Engineering Computing and Applications in Sciences, 2009, ADVCOMP '09. Third International Conference on IEEE, Piscataway, NJ, USA, Oct. 11, 2009, pp. 175-180, XP031584634.

French Search Report and Written Opinion dated Oct. 31, 2012 for corresponding French Application No. 12 52876, filed Mar. 29, 2012.

* cited by examiner

SYSTEM FOR SUPERVISING THE SECURITY OF AN ARCHITECTURE

CROSS-REFERENCE TO RELATED APPLICATIONS

This application is a Section 371 National Stage Application of International Application No. PCT/FR2013/050648, filed Mar. 26, 2013, the content of which is incorporated herein by reference in its entirety, and published as WO 2013/144497 on Oct. 3, 2013, not in English.

FIELD OF THE DISCLOSURE

The present invention relates to a system and a method for supervising the security of an architecture that comprises a plurality of interconnected so-called "cloud computing" environments. The term usually used for this type of architecture is "inter-cloud architecture". More precisely, the invention relates to the protection of environments comprising a plurality of interconnected elementary heterogeneous architectures.

The invention has a particularly beneficial application in the security of complex computing systems of cloud computing type, the architecture of which is based on dematerialized computing resources, which are made available to a large number of users who access them remotely and progressively over time, i.e. on demand.

BACKGROUND OF THE DISCLOSURE

The concept of cloud computing refers to computer architectures wherein computer processes conventionally located on client terminals of users of a business, or on servers of the business, are relocated to remote servers. Remote hardware resources, distributed across the world, are thus accessed on demand via the Internet to create services that can be accessed online by users. Applications and data are no longer found on the local computer of the user, or on the server situated in the business of this user, but rather in a cloud composed of a certain number of interconnected remote servers.

There are many kinds of services offered based on architectures of this kind. Different cloud computing service models thus exist. A first model is thus known called SaaS (from the English Software-as-a-Service), wherein a provider of a cloud computing architecture solution makes a complete software stack, from the hardware to the applications, available to the user. A second model is known called PaaS (from the English Platform-as-a-Service), wherein the users deploy their own applications using environments and tools made available by the cloud provider. Finally, a third model is known called IaaS (from the English Infrastructure-as-a-Service), wherein the cloud computing provider makes computation, communication or storage resources available to the users. The users can then deploy and execute any software program, including their own operating system, which operates using the resources thus made available. Several models of cloud computing architecture deployment can also be discerned: a public model, a private model, a community model and a hybrid model. With the public cloud model, the resources are made available by a solutions provider and accessible via the Internet. The private cloud model is operated for the purposes of a single organization. The community cloud model is made available to several organizations that share a common problem. Finally, the hybrid cloud is composed of different public, private, or community cloud architectures. This last type of model is also called an inter-cloud infrastructure.

A cloud computing architecture generally relies on a plurality of physical machines interconnected by a network. These machines are generally grouped into one or more server farms (the term usually used is the English term datacenter) distributed geographically and connected by way of the Internet, or by a private network. In this architecture an inter-farm network can then be discerned, which connects the server farms to each other, and an intra-farm network that connects the physical machines inside a farm. An inter-cloud architecture then corresponds to the networking of elementary cloud architectures, constructed above the interconnected server farms, each elementary cloud architecture being able to operate a particular model of deployment or service. The present invention is concerned with an inter-cloud architecture.

It will be understood that such an architecture can be fairly complex, in terms of types of coexisting networks, heterogeneity of equipment and services provided. It will also be understood that in terms of security management, such an architecture entails a very high level of complexity.

From the security point of view, it is conventional in a cloud computing architecture for physical and virtual resources to be organized and supervised by security domains. A security domain groups together a plurality of resources to be protected and supervised, and security rules to be applied to the resources of the domain to ensure secure operation within the domain. The resources can be grouped into a domain according to different criteria: according to whether they relate to one and the same functionality, for example access control, according to whether they belong to one and the same organization, according to whether they are situated inside one and the same physical boundary, etc. In the latter case, a security domain can group together the resources of a physical machine, of a farm or of a cloud architecture. A security domain, for example the security domain associated with access control, comprises user resources to be protected and supervised, for example a password entry application, just as it comprises resources associated with security components making it possible to guarantee the application of security rules to the resources of the domain. The security components can provide detection or reaction functions and comprise for example firewalls, intrusion detection systems, intrusion prevention systems, etc.

Moreover, it is also conventional for a cloud architecture to be divided into different execution layers. In this model, it is possible to discern a physical layer, which for example comprises computing, storage or other resources, a virtualization layer that allows the management, i.e. the creation and release, of virtual machines, and a virtual layer that comprises virtual machines. Among the virtual machines, the "user" virtual machines can be distinguished from the "security" virtual machines.

This organization into domains and layers results in considerable complexity for an inter-cloud architecture, exposure to many security threats and extremely complex security management.

Security management solutions do exist. Some propose the layer-by-layer management of the security of an architecture. However, it is difficult for these solutions to manage the consistency between layers of different levels of abstraction. Others propose management of the security by domain. However, these solutions do not allow the management of security between different domains. In any case, such solutions are poorly suited to the complexity of inter-cloud architectures that can implement different security mechanisms in each of the cloud computing architectures that are part of the inter-cloud architecture.

There is currently no satisfactory solution enabling the management of the security of an inter-cloud architecture.

SUMMARY

An exemplary embodiment of the invention proposes a method for supervising the security of an architecture comprising a plurality of interconnected clouds, a cloud comprising a plurality of resources and a security supervisor, the plurality of resources forming a plurality of resource groups in the cloud that are respectively associated with a security domain, a security controller supervising the resources of the domain, a plurality of physical machines comprising the resources of the plurality of clouds, the method comprising:

- a step of reception of a security event by a security controller of a first cloud, originating from a first resource associated with a first security domain,
- a step of sending of said security event to the security supervisor of the first cloud,
- a step of sending of a security order by the security supervisor of the first cloud in reaction to the security event to at least a second security controller of the first cloud, and of sending by the second security controller to a second resource supervised by the second controller.

The method according to the invention makes it possible to supervise the security of a heterogeneous architecture composed of several interconnected cloud computing architectures, in a homogeneous way and regardless of the number of security domains structuring a cloud architecture. The method thus makes it possible to trigger inter-domain reactions, i.e. reactions between several security domains, inside a cloud architecture, which current supervision solutions do not allow. In particular, the inter-domain security mechanisms are coordinated by means of the security controller, which acts as a final decision point in the reactions or security orders to be transmitted to resources that it supervises, all domains together.

An inter-domain reaction consists for example in a reconfiguration of firewalls of security domains adjacent to a first security domain where an intrusion has been detected. This reconfiguration operation consists in modifying the configuration rules of these firewalls in order to preventively block traffic deemed to be potentially malicious. Thus, even if the traffic can break through the firewalls of the first domain, it will be blocked by the firewalls of the adjacent domains in order to avoid propagation of an attack following the intrusion.

Advantageously, the method according to the invention comprises a step of detection of an inconsistency between a knowledge base of the supervisor, said base comprising all the security events sent by the controllers of the first cloud and a rules base of the first cloud, said base comprising the rules of operation inside the first cloud.

Inter-domain supervision is performed automatically. Indeed, the method guarantees coupling between the detection of security events, the making of a decision and the reaction that translates into security orders transmitted to resources of a cloud architecture. This automation is made possible by the confrontation of the uploaded security events, with a reactions base managed at the level of the security controller and with decision-making being performed autonomously by this controller.

In an exemplary embodiment of the invention, the first resource included in the first security domain being associated with a first execution level, the method furthermore comprises a step of selecting and sending of a second security order by the security controller of the first domain to a third resource of the first security domain, the third resource being associated with a second execution level.

According to this embodiment, the method makes it possible to orchestrate the management of security in an arbitrary number of execution layers. Thus, the security controller disposes of the means, in interface terms, for triggering a reaction following a security event received from a first resource belonging to a first execution layer, to a second resource belonging to a different execution layer from that of the first resource.

Advantageously, the respective security supervisors of the clouds comprise a set of security rules forming a security policy, the method comprising:

- a step of sending, by the supervisor of the first cloud, of information relating to the security event to the other cloud supervisors, and
- a step of negotiation of a second security order between the first supervisor and the other supervisors, the negotiation step being based on the information relating to the security event and on the respective security policies of the security supervisors,
- a step of sending of the second security order to at least a third resource, the third resource being included in a cloud different from the first cloud.

The method of the invention being the supervision of the security in the whole of the inter-cloud architecture, it thus makes it possible to deduce reactions, in the form of security orders, to resources that belong to a different cloud architecture from that in which a first security event has arisen. This possibility is offered by the negotiation capabilities between the different supervisors, thus making it possible to negotiate on the basis of their security policy. Thus, it becomes possible to prevent security events before they occur. Indeed, a first security event having arisen in a first cloud architecture, and uploaded by the supervisor of this first architecture, can trigger a reaction at the level of a second cloud architecture without any security event having been uploaded in this second architecture. In the course of the negotiations between the supervisors, the supervisor of the second cloud architecture can decide to implement a preventive measure, in the form of a security order, in view of the security event that has occurred in the first architecture and of its security policy.

The invention also relates to a system for supervising the security of a computing architecture, said architecture comprising a plurality of interconnected clouds, a cloud comprising a plurality of resources and a security supervisor, the plurality of resources forming, in the cloud, a plurality of groups of resources respectively associated with a security domain, a security controller supervising the resources of the domain, a plurality of physical machines comprising the resources of the plurality of clouds, the system comprising:

- reception means, included in a security controller of a first cloud, designed to receive a security event originating from a first resource associated with a first security domain,
- first sending means, included in the security controller, designed to send said security event to the security supervisor of the first cloud,
- second sending means, included in the supervisor of the first cloud, designed to send a security order to at least a second security controller of the first cloud in reaction to the security event, third sending means, included in the second controller, designed to send the security order to a second resource supervised by the second controller.

BRIEF DESCRIPTION OF THE DRAWINGS

Many details and advantages of the invention will be better understood upon reading the description of a particular embodiment with reference to the appended drawings given by way of non-limiting example, wherein.

DETAILED DESCRIPTION OF ILLUSTRATIVE EMBODIMENTS

Figure 1:
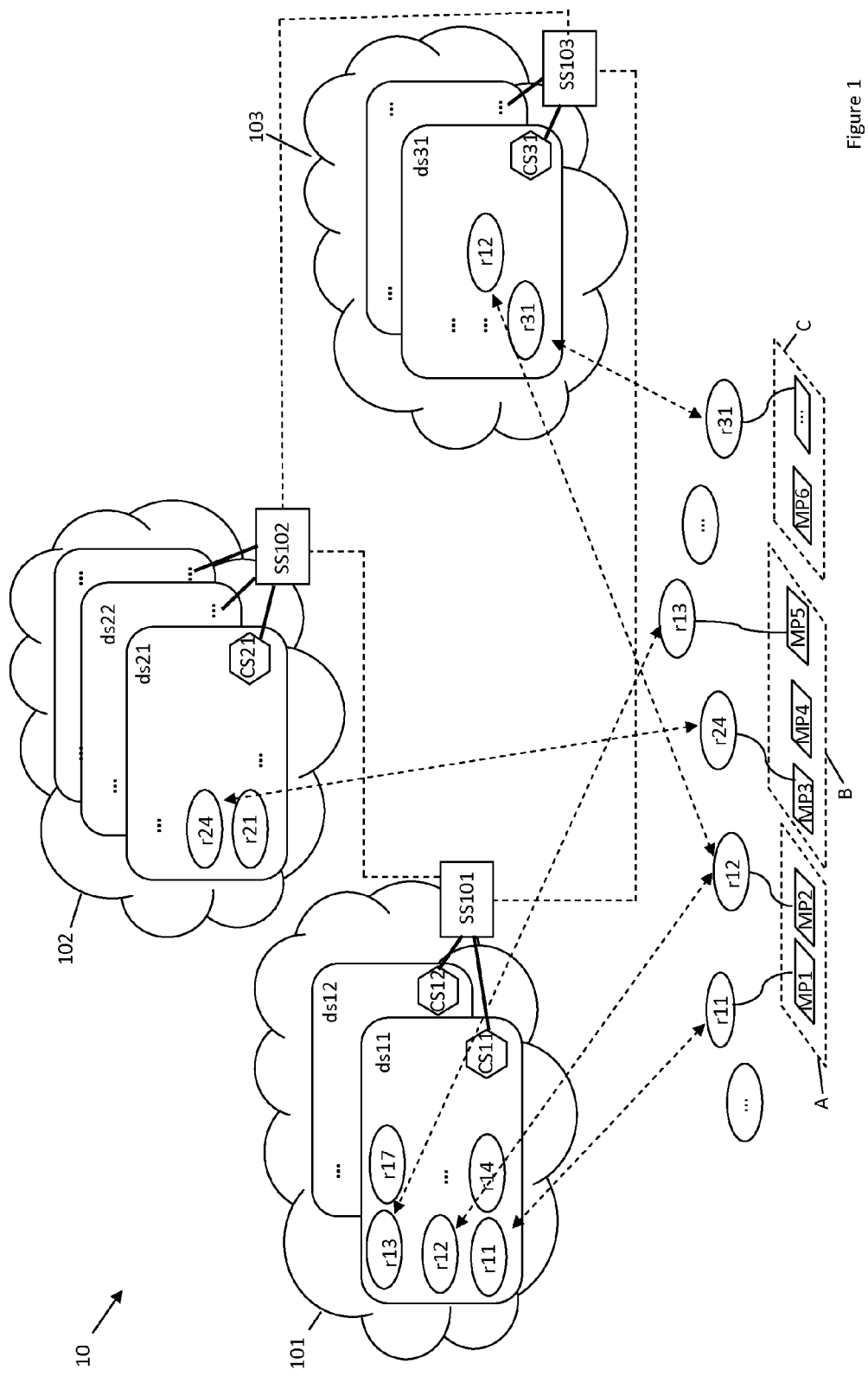
FIG. 1 shows an exemplary embodiment of a supervision architecture that implements a supervision method described in relation to FIG. 2.

An architecture for supervising the security of a system, according to a first exemplary embodiment, will now be described in relation to FIG. 1.

An architecture 10 comprises a plurality of elementary architectures in the cloud, or clouds, 101, 102, 103 (the term usually used to refer to an infrastructure in the cloud, or a cloud, is "cloud computing architecture"). Each cloud 101, 102, 103, comprises:

resources. For example, the cloud 101 comprises the resources r11, r12, r13, r14, r17, etc.; the cloud 102 comprises the resources r21, r24, etc.; and the cloud 103 comprises the resources r31, r12; etc.;

security controllers. The cloud 101 comprises the controllers CS11 and CS12; the cloud 102 comprises the controller CS21, etc.; the cloud 103 comprises the controller CS31, etc.;

a security supervisor, SS101, SS102, SS103.

Such an architecture, which connects a plurality of elementary cloud computing architectures, forms an inter-cloud architecture.

The resources r11, r12, r13, r14, r17, r21, r24, r31, etc., are grouped together in such a way as to form a plurality of groups, respectively associated with a security domain ds11, ds12, ds21, ds22, ds31, etc. Each security domain ds11, ds12, ds21, ds22, ds31, etc., groups together resources according to a predefined criterion. For example, a security domain groups together resources that concern one and the same security function, for example access control, or resources situated inside one and the same physical boundary, for example resources that come from one and the same physical machine, or resources that are situated inside one and the same logical boundary, for example resources that belong to one and the same sub-network, etc. It is noteworthy that one resource can be associated with several security domains. This is the case, for example, of the resource r12, which belongs to the domain ds11 of the cloud 101 and to the domain ds31 of the cloud 103.

In this architecture, a security controller of a domain, for example the controller CS11, is in charge of the supervision of all the resources of the security domain, here ds11. The security controller CS11 is adapted to be informed, by the resources of the domain ds11, of the arising of supervised security events, to aggregate these security events and to trigger, where applicable, a reaction following the uploading of the security events onto one or more of the resources that it supervises. The reaction corresponds to a security order sent to a resource for execution. Such a reaction, local to the security domain ds11, is called a reflex reaction. It is immediate to the arising of the security event and is intended for example to react to the detection of an attack. To do this, the security controller CS11 comprises for example a rules base (not shown in FIG. 1) which associates with a security event a reaction on one or more of the resources of the domain ds11 that it supervises. Such a reaction makes it possible to respond quickly to critical security events. The security controller CS11 is also adapted to interact with the security supervisor of the cloud SS101, by transmitting to it all security events received from a resource of the domain ds11 and by transmitting, where applicable, security orders received from the security supervisor of the cloud SS101 to one or more resources of the domain ds11. The security controller CS11 thus makes it possible to create and manage inter-level rules of execution.

In this architecture, the security supervisor of a cloud, for example the supervisor SS101 of the cloud 101, is capable of driving all the security controllers of the cloud 101, in this case CS11, CS12, etc., and of synchronizing the detection and the reaction between the different domains of the cloud 101 in such a way as to trigger consistent and optimized reactions on resources of the cloud 101. Indeed, the arising of a security event on a resource of a first domain, for example ds11, can be linked to a resource of a second domain, for example ds12, and can therefore require a reaction on a resource of a domain different from that in which the resource that is at the origin of the arising of the security event is found. To implement such a synchronization, the security supervisor SS101 includes a knowledge base (not shown in FIG. 1) adapted to store any security event transmitted by a security controller of the cloud 101 and a base of supervision rules (not shown in FIG. 1). These rules are defined by an administrator (not shown in FIG. 1) of the cloud 101. For this purpose, the rules base comprises, in association with a rule, one or more actions to be triggered when a rule is not complied with. The supervisor SS101 is also capable of indirectly driving the security controllers of the other clouds 102, 103, by way of the other supervisors SS102, SS103. More precisely, the security supervisor SS101 is capable of negotiating with the other supervisors of the architecture, here SS102 and SS103, in such a way as to correlate a security policy that it applies at the level of the cloud 101 with respective security policies of the other clouds. The security policy of a cloud defines a cloud security strategy and can include different sets of rules to be applied, according to the orientation that the strategy takes. This capacity for negotiation with the other supervisors of the architecture 10 makes it possible to ensure global and homogeneous supervision of the architecture in terms of security. For example, if the respective security policies of the clouds are based on different formalisms, the negotiation between the respective security supervisors of the clouds makes it possible to compare terms that are syntactically different but of equivalent semantics and to associate them. Such a negotiation thus makes it possible, following a security event that has arisen on a resource of a first cloud, for example the cloud 101, to deduce a reaction on a resource of a second cloud, for example the cloud 102. Advantageously, the reaction deduced on the second cloud 102 can prevent the arising of a critical security event in the second cloud 102.

Figure 3:
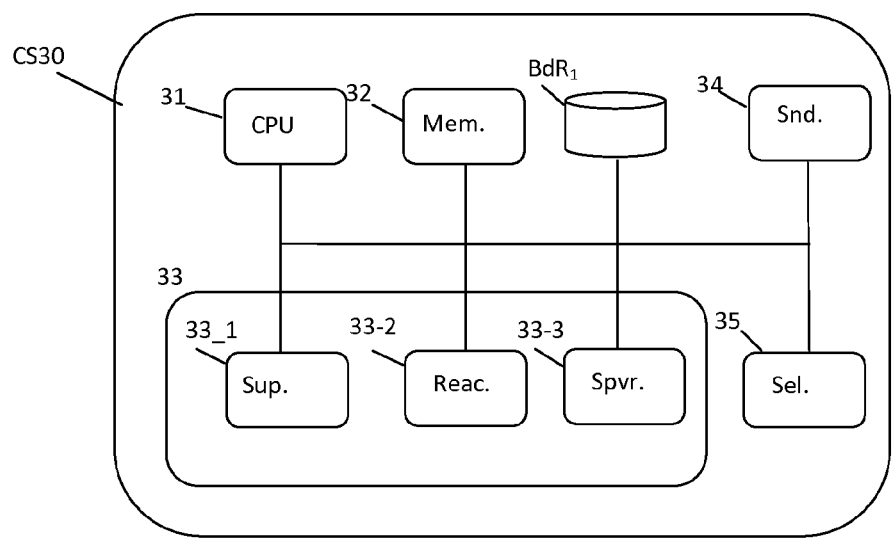
FIG. 3 is a schematic representation of a security controller of the architecture according to the invention.
Figure 4:
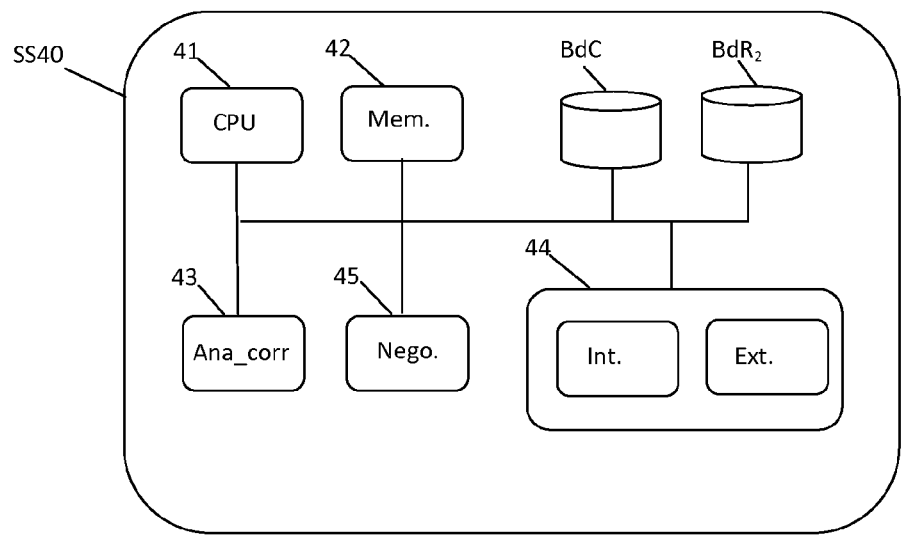
FIG. 4 is a schematic representation of a security supervisor of the architecture according to the invention.

The structures of a security controller and a security supervisor will be detailed in relation to FIG. 3 and FIG. 4 respectively.

According to a known principle of cloud computing architectures, the clouds 101, 102, 103 rely on a plurality of physical machines MP1, MP2, MP3, MP4, MP5, MP6, etc., grouped where applicable into server farms A, B, C; the term usually used for server farms is the English term datacenter. The resources r11, r12, r13, r14, r17, r21, r24, r31, etc., of the clouds 101, 102, 103, included in the physical machines MP1, MP2, MP3, etc., are made available to the clouds 101, 102, 103 in order to form the inter-cloud architecture 10.

In a known manner, each resource is associated with an execution layer. Different models of execution layers exist. For example, in a first model, a first execution layer is a hardware execution layer. According to this model, the resource r11, associated for example with this first execution layer can correspond to a network interface, or to memory, or to a microprocessor etc. In this first model, a second execution layer is a virtualization layer. The virtualization layer allows the management, i.e. the creation and release of virtual machines executed concurrently on one and the same physical machine. This virtualization layer is implemented by a hypervisor (not shown in FIG. 1) which manages the allocation of physical resources between different instances of virtual machines. Thus, the resource r12, associated for example with this second execution layer, can correspond to the hypervisor, or to a low-level software bus, intended to manage the communications between the virtual machines hosted by the physical machine. Finally, in this model, a third execution layer is a virtual layer. The resources associated with this layer are virtual machines that are executed on the physical machine. The virtual machines can be user virtual machines that can comprise sensitive data or code to be protected. The virtual machines can also be security virtual machines, dedicated to security and intended to protect the user virtual machines. The security virtual machines are for example firewalls, intrusion detection systems, intrusion prevention systems, tools to combat malicious software (the term usually used is the English term anti-malware, etc.). Thus, the resource r13 associated for example with this third layer is a user virtual machine of password entry application type. The resource r17 also associated with this third layer is for example a firewall, intended to filter the inputs and outputs of a network as a function of predefined rules. Other layer models of a cloud computing infrastructure are known to those skilled in the art and are not described here. In all these models, a resource is associated with a particular execution layer.

Thus a security domain, for example the domain ds11, groups together the resources associated with this domain, for example the access control domain, and the security controller CS11, associated with the domain ds11, accesses the resources of the domain ds11 by way of the execution layer with which they are associated. For this purpose, each execution layer comprises two interfaces allowing the security controller CS11 to access the resources associated with this execution layer. A first interface, called supervising interface (the term usually used is the English term monitoring), allows the resources to upload all supervised security events to the security controller CS11. A second interface, called administration interface, allows the security controller CS11 to send a security order in reaction to a security event previously uploaded into the architecture. For reasons of clarity in the figure, the interfaces are not shown. It will be noted that according to the invention, a security order transmitted to a first resource of a security domain by a first security controller does not necessarily follow a security event uploaded by the first resource to the first controller. Thus, the security order transmitted to the first resource can follow a security event transmitted from a second resource of the same security domain, or from a second resource from another security domain of the same cloud. According to the invention, the security order can also follow a security event that has arisen in another cloud of the architecture 10. Moreover, a security order can affect a resource of a different execution layer from that via which the security event has been uploaded.

A method for supervising the security of a system, according to a first embodiment, will now be described in relation to FIG. 2. The security supervision method is implemented on an architecture compliant with the supervision architecture 10 described in relation to FIG. 1.

Figure 2:
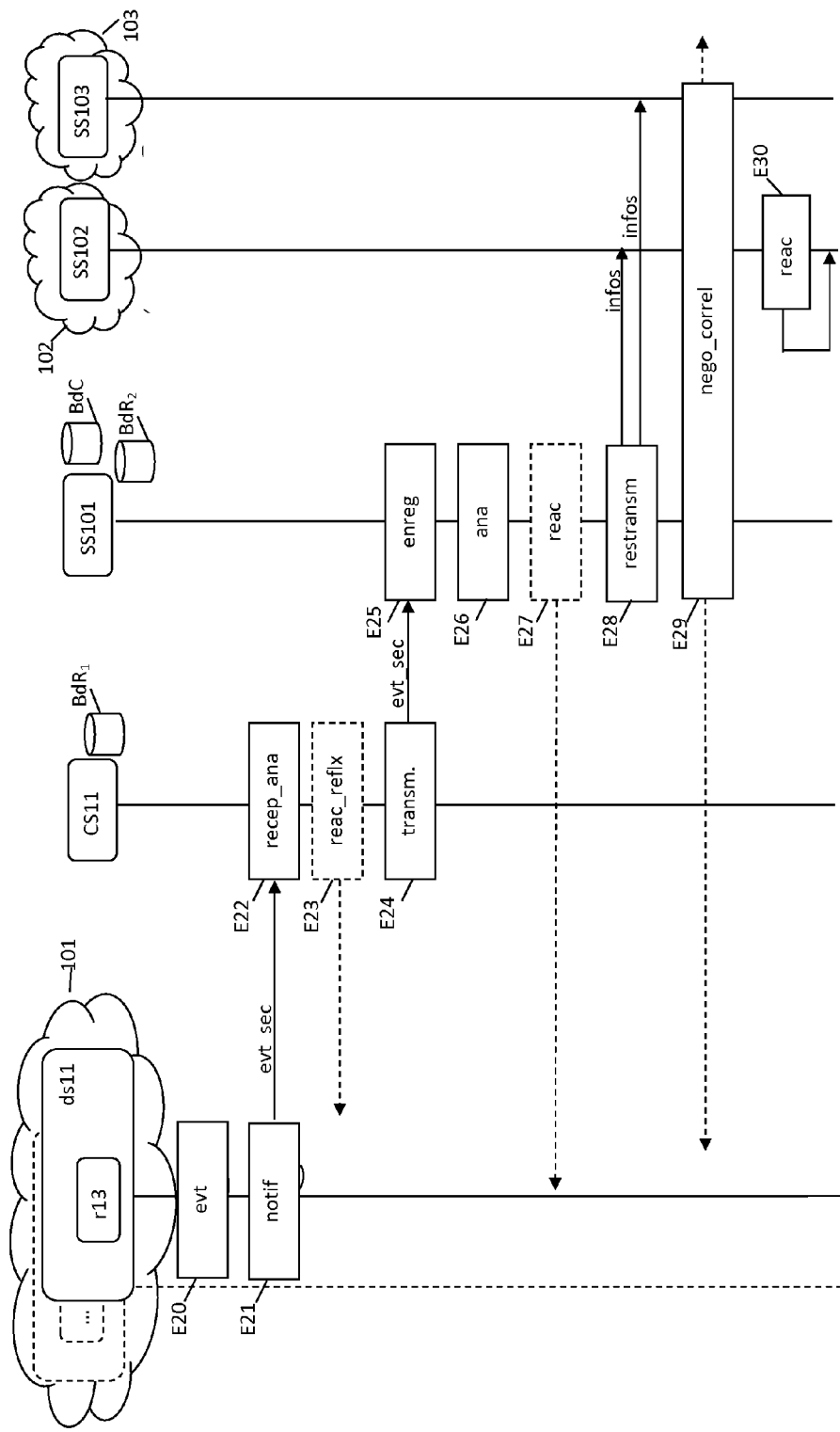
FIG. 2 shows the steps of the security supervision method, according to a first exemplary embodiment.

In a prior configuration phase, not shown in FIG. 2, the security controllers CS11, CS12, CS21, CS31, etc. of the architecture 10 register with the execution layers to be supervised by means of the supervising interfaces. Thus, the security controllers are capable of receiving the security events that arise on the resources that they supervise, and of transmitting security orders to the resources that they supervise.

In an initial step E20 of an event arising, a supervised security event occurs on a resource, for example the resource r13 which belongs to a first execution layer (not shown in FIG. 2) and which is part of the security domain ds11 of the cloud 101. The security domain ds11 is for example a security domain related to access control, the resource r13 is for example a password entry application. Such a security event is for example a password entry error by a user.

In a notification step E21, the resource r13, parameterized to upload such an event, transmits said event to the security controller CS11 of the domain with which it is associated, across the supervising interface (not shown in FIG. 2) of the execution layer with which it is associated.

In a reception and analysis step E22, the security controller CS11 receives the security event sent by the resource r13 during the preceding step. The security controller CS11 analyzes this event. This analysis is intended to optionally deduce an immediate reaction on the resource by way of a security order to be applied. During this analysis, the controller checks that it is parameterized to implement a reaction on the resource. For this purpose, it consults a reaction base $BdR_1$ to which it has access. Such a base $BdR_1$ defines for a security event an associated reaction, or security order. If such a security order is present in the base, the controller, in a reflex reaction step E23, transmits the security order to the resource r13 or to another resource of the same domain ds11 by way of the administration interface of the associated execution layer. If no security order is present in the base, it transmits nothing to the resource. The optional reflex reaction step E23 is shown in dotted lines in FIG. 2.

In a subsequent transmission step E24, the security controller CS11 transmits to the security supervisor SS101 of the cloud 101 the security event that it has received during the step E22. All the security controllers of the cloud 101 are liable to transmit to it the security events of their respective security domains. Thus, the security supervisor SS101 is a hub of the security events liable to arise in the cloud.

In a storage step E25, the security supervisor SS101 stores the security event received during the preceding step in a knowledge base BdC. The knowledge base is intended to store all the security events issued by the security controllers of the cloud 101.

In an analysis step E26, the security supervisor SS101 checks the consistency of the knowledge base BdC thus enriched with a second base of predefined rules $BdR_2$. This second rules base $BdR_2$ is defined beforehand by an administrator of the cloud 101. This second base $BdR_2$ defines the rules to be observed at the level of the cloud 101, in particular by all the resources of the cloud 101. The second rules base $BdR_2$ also defines a reaction to be implemented on one or more resources included in the cloud 101 when a rule is not observed. The reaction corresponds to a security order to be applied to one or more resources. It will be noted that a security order can affect one or more resources of one or more security domains of the cloud 101, the affected resources being able to be situated in different execution layers.

If the knowledge base BdC is not consistent with the second rules base $BdR_2$ managed by the security supervisor SS101, then the security supervisor SS101 triggers in a reaction step E27 the reaction or reactions defined in the second rules base $BdR_2$ for the rule that is not observed by sending one or more security orders. This reaction is applied to one or more resources of the cloud 101, situated in one or more different security domains and on one or more different execution layers. Thus, according to the invention, the supervisor SS101 allows the implementation of inter-domain security rules. The security supervisor SS101 thus acts as final decision point and guarantees the maintenance of a global consistency of security between all the resources of the cloud 101. It will be noted that this reaction step E27 is not executed when the knowledge base BdC is consistent with the second rules base $BdR_2$. It is shown in dotted lines in FIG. 2.

In a retransmission step E28, the security supervisor SS101 transmits to the security supervisors of the other clouds of the architecture, in this case to the supervisors SS102 and SS103 of the clouds 102 and 103 of the architecture 10, information related to the security event that has occurred at the level of the resources r13. This information can comprise the security event as received from the security controller CS11 during the reception and analysis step 22, optionally the security order transmitted by the security controller CS11 to one or more resources of the domain ds11 during the reflex reaction step E23, and/or by the security supervisor SS101 during the reaction step E27. The aim of this retransmission step E28 is to inform the other security supervisors SS102, SS103 of a security event that has arisen in the cloud 101 and of the way in which it has been processed in the cloud 101. By thus warning the other supervisors SS102 and SS103 of the architecture 10 it becomes possible to deduce security reactions in clouds other than those where the security problem has been detected. It is thus possible to prevent the arising of the same security event in another cloud, or to identify that the origin of the security event is situated in another cloud, etc.

In a step E29 of negotiation and correlation of security policies, the security supervisors SS101, SS102, SS103 of the different clouds 101, 102, 103 negotiate on the basis of this information, in this case the security event and optionally the security order or orders that have been applied, and their respective security policies. Each cloud 101, 102, 103, or more precisely each cloud administrator, defines in a security policy a security strategy or an action plan for maintaining a certain level of security in the cloud. The security policy of a cloud can translate into a set of technical rules to be observed by the resources of the cloud. For example, the security policy can define rules for the management of passwords, rules for remote access etc. For example, a rule can establish that in the case where a user enters an incorrect password three times on a password entry application with the aim of accessing a given application, access by this user to this application is blocked. Many formalisms are known for describing formal security policies. In the case of the architecture 10, which can be heterogeneous in the sense that the clouds 101, 102, 103 each have a security policy, it is possible that the formalisms used for describing the respective security policies of the clouds will be different. In this case, the step of negotiation between the different supervisors SS101, SS102, SS103 makes it possible to unite the different security policies applied in the different clouds 101, 102, 103 and to establish equivalences between a first rule defined in the first cloud 101 by means of a first formalism, and a second rule defined in the second cloud 102 by means of a second formalism. Thus, this negotiation step makes it possible to compare the different security policies applied in the different clouds, although the latter are described with different formalisms.

In a following, optional inter-cloud reaction step E30, a new security order is sent by a second security supervisor, for example the supervisor SS102, to one or more resources of the cloud 102. This new order, consecutive to the negotiation step E29, makes it possible for example to prevent a new security event in the cloud 102 that has not yet occurred but which can occur in the same way that the security event has occurred in the cloud 101. In this example, the security event that has occurred during the step E20 of a security event arising has been identified as being able to occur in the cloud 102 during the negotiation. In another exemplary embodiment, the negotiation step E29 makes it possible to identify that the security event that has occurred during the step E20 in the cloud 101 has its origin in a resource of the cloud 102. Thus, the negotiation conducted by the different security supervisors SS101, SS102, SS103 can induce reactions on any resource of the architecture 10.

In an exemplary application of the invention, we will consider a client of a provider of an architecture compliant with the architecture described in relation to FIG. 1. The architecture comprises several interconnected elementary cloud computing architectures. These architectures respectively represent the clouds 101, 102, 103. Each elementary cloud architecture has its own service model. Different service models are known. In a first model, called SaaS (from the English Software-as-a-Service), a provider of a cloud computing architecture solution makes a complete software stack, from the hardware to the applications available to the user. In a second model, called PaaS (from the English Platform-as-a-Service), the users deploy their own applications using environments and tools made available by the cloud provider. Finally, in a third model, called IaaS (from the English Infrastructure-as-a-Service), the cloud computing provider makes computation, communication or storage resources available to the users. The users can then deploy and execute any software program, including their own operating system, which operates with the resources thus made available. Thus, in this exemplary application, the cloud 101 operates according to the IaaS model, the cloud 102 operates according to the SaaS model, and the cloud 103 operates according to the PaaS model. The client is subscribed to the same architecture provider, which offers the client several cloud architectures of different respective levels. Each of the cloud architectures, in this case the clouds 101, 102, 103, is composed of several security domains corresponding to the cloud model being considered. It is supposed that for each security domain and each cloud model there are deployed heterogeneous intrusion detection and countermeasure types of technology at different abstraction layers, i.e. at the IaaS, SaaS and PaaS levels. Thanks to the invention, the client can then obtain a unified view of the security of their inter-cloud infrastructure. Indeed, it is considered that the inter-cloud infrastructure is composed of three software layers: IaaS, PaaS and SaaS. For each cloud architecture of the infrastructure, i.e. for each cloud, and for each security domain in this architecture, a security controller selectively supervises the relevant layers according to the model deployed. Thus, in the cloud 101, corresponding to the IaaS model, a controller supervises the IaaS layer. In the cloud 102, corresponding to the SaaS model, a controller supervises the IaaS and PaaS layers. In the cloud 103, corresponding to the SaaS model, a controller supervises the IaaS, PaaS and SaaS layers. These different views are then aggregated for each of the elementary clouds by a security supervisor. The supervisors of each cloud can then talk to each other to trigger inter-cloud reactions, negotiate security policies, or reconcile heterogeneous policies and mechanisms between each cloud.

A security controller according to a first exemplary embodiment of the invention will now be described in relation to FIG. 3.

The security controller CS30 is intended to supervise a set of resources (not shown in FIG. 3) grouped into a security domain (not shown in FIG. 3) and to talk to a security supervisor (not shown in FIG. 3) of the cloud. By supervision is meant in this case the capability to be informed of supervised security events that arise at the level of the resources, and to send security orders to the resources in reaction to these security events. The security controller CS30 is also adapted to transmit to the security supervisor any security event received from a resource of the security domain that it supervises, and to receive a security order from the supervisor and retransmit it to a resource of the domain. For this purpose, the security controller is an item of computing equipment such as a server which comprises:

- a processing unit 31, or CPU (from the English Central Processing Unit);
- a set of memories 32, including a RAM (Random Access Memory) used to execute code instructions, store variables etc., and a re-writable memory suitable for storing a reactions base BdR1,
- a set 33 of interfaces, suitable for talking on the one hand to the resources and on the other hand to the security supervisor. The resources of a security domain are respectively associated with an execution layer, for example a hardware layer, a virtualization layer, a virtual layer, etc. Thus, this set 33 of interfaces comprises:
  - supervising interfaces 33-1, suitable for receiving resources from the security events that occur on the resources. The security events that must be uploaded are parameterized beforehand. More precisely, each execution layer comprises a supervising interface. A resource being associated with an execution layer, the security events uploaded to the controller use the supervising interface associated with the execution layer of the resource. The interfaces 33-1 form first reception means, designed to receive a security event from a resource that it supervises;
  - reaction interfaces 33-2 suitable for transmitting to a resource a security order to be applied. Each execution layer comprises a reaction interface. These interfaces 33-2 form first sending means, designed to send a security order to a resource. The security order can be selected from the reactions base BdR1. Such orders correspond to reflex reactions. The security order can also be received from the supervisor;
  - a communication interface 33-3 for communication with the security supervisor of the cloud. This communication interface 33-3 is intended to transmit to the supervisor any security event received by the controller through one of the supervising interfaces 33-1, and to receive from the supervisor security orders to be transmitted to one or more resources that the controller supervises, through one of the reaction interfaces 33-2. This communication interface 33-3 forms second reception means, designed to receive from the supervisor a security order to be transmitted to one of the resources that it supervises. It also forms second sending means, designed to transmit to the security supervisor the security event received from the resource;
- a reactions base $BdR_1$ which associates a reaction with a security event. A reaction consists in a security order to be applied to a resource. Thus, this reactions base BdR1 allows the controller CS30 to identify, on reception of a security event issued by a resource, a security order to be sent to the resource or to another resource of the security domain. The other resource is potentially associated with a different execution layer from that associated with the resource that is at the origin of the security event;
- selection means 34, designed to select a security order to be applied to a resource following the reception of a security event. These reaction means take as input the security event received from the resource and the reactions base $BdR_1$ and provide as output a security order, called reflex reaction, for the attention of a resource of the domain that it supervises;

The means described above communicate via a communication bus.

The set of interfaces 33 and the selection means 35 are preferably software modules comprising software instructions for executing the steps of the supervision method implemented by the security controller.

A security supervisor according to a first exemplary embodiment of the invention will now be described in relation to FIG. 4.

The security supervisor SS40 is suitable for driving all the security controllers of the cloud (the controllers and the cloud are not shown in FIG. 4) with which it is associated. Thus, the supervisor guarantees coordination and consistency of the security that is applied at the cloud level, via the different controllers. Moreover, it acts as a final decision point and makes it possible to implement optimized reactions between security domains at the level of the resources of the cloud. The supervisor SS40 is also suitable for negotiating and correlating security policies with other security supervisors of other clouds. Thus, the supervisor makes it possible to ensure a supervision of the global architecture, even if the latter is composed of heterogeneous elementary cloud architectures, forming as a whole an inter-cloud architecture. It moreover guarantees a homogeneity of the security in the global architecture. The supervisor SS40 is an item of computing equipment such as a server that comprises:

- a processing unit 41, or CPU;
- a set of memories 42, including a RAM (Random Access Memory) used to execute code instructions, store variables etc., and a re-writable memory suitable for storing a knowledge base BdC, a reactions base BdR2 and a security policy PS;
- the knowledge base BdC, suitable for storing any security event that has arisen at the level of a resource of the cloud and has been received by a security controller of the cloud that supervises the resource;
- the reactions base $BdR_2$, suitable for storing rules of correct operation and reactions to be implemented inside the cloud;
- the security policy PS defines a global strategy for security at cloud level. Such a strategy makes it possible to adapt the security according to events that occur inside the cloud and that are uploaded to the supervisor. Thus, according to the events that are uploaded, one set of rules defining the reactions to be implemented can be preferred to another;

analysis and reaction means 43, designed to analyze the security events stored in the knowledge base BdC with regard to the reactions stored in the reactions base $BdR_2$, and to deduce reactions on the resources of the cloud. The reactions translate into security orders to be applied to the resources of the cloud;

a set 44 of communication interfaces. This set 44 of interfaces comprises:

internal communication interfaces 44-1, designed to communicate with the security controllers of the cloud. More precisely, these internal interfaces 44-1 are designed to receive from the security controllers all the security events received from the resources by the security controllers, and to transmit to the controllers security orders generated on the basis of the analysis and correlation means 43. The internal interfaces 44-1 form sending means, designed to send to the security controllers of the cloud security orders to be applied to one or more resources of the cloud by way of these controllers, and reception means, designed to receive from the security controllers of the cloud security events that have arisen at the level of resources supervised by these controllers;

external communication interfaces 44-2, designed to communicate with the other security supervisors of the architecture.

negotiation and correlation means 45 designed to negotiate with other supervisors of the inter-cloud architecture on the basis of the respective security policies of the clouds and to correlate these policies in such a way as to obtain a global and homogeneous security policy. The negotiation and correlation means 47 make it possible, optionally, to generate security orders to be applied inside the cloud.

The means communicate via a communication bus.

The analysis and reaction means 43, the set of interfaces 44 and the negotiation means 45 are preferably software modules comprising software instructions for executing the steps of the supervision method described in relation to FIG. 2 which are executed by the supervisor.

Although the present disclosure has been described with reference to one or more examples, workers skilled in the art will recognize that changes may be made in form and detail without departing from the scope of the disclosure and/or the appended claims.

The invention claimed is:

1. A method for supervising security of an architecture, the method comprising:

reception of a security event by a first security controller of a first cloud, said first cloud belonging to a plurality of interconnected clouds of the architecture, wherein each cloud of the plurality comprises a plurality of resources and a security supervisor, the plurality of resources forming a plurality of resource groups in the cloud that are respectively associated with a security domain, wherein each security domain comprises a security controller that supervises the resources of the security domain, and a plurality of physical machines comprise resources of the plurality of interconnected clouds, wherein the respective security supervisors of the interconnected clouds comprise a set of security rules forming a security policy, and wherein said security event originates from a first of the resources associated with a first of the security domains, sending said security event to the security supervisor of the first cloud, sending a security order by the security supervisor of the first cloud to at least a second security controller of the first cloud in reaction to the security event, and sending the security order by the second security controller to a second resource supervised by the second security controller, sending, by the security supervisor of the first cloud, information relating to the security event to the other security supervisors of the other interconnected clouds of the plurality of interconnected clouds negotiation of a second security order between the security supervisor of the first cloud and the other security supervisors, the negotiation being based on information relating to the security event and on the respective security policies of the other security supervisors, and sending by one of the other security supervisors of the second security order to at least a third resource, the third resource being included in a cloud of the plurality of interconnected clouds, different from the first cloud.

2. The supervision method as claimed in claim 1, comprising:

detection of an inconsistency between a knowledge database of the security supervisor, said knowledge database comprising all the security events sent by the security controllers of the first cloud and a rules database of the first cloud, said rules database comprising the rules of operation inside the first cloud.

3. The supervision method as claimed in claim 1, wherein, the first resource included in the first security domain being associated with a first execution level, the method furthermore comprises:

selecting and sending a second security order by the first security controller of the first security domain to a fourth resource of the first security domain, the fourth resource being associated with a second execution level.

4. A system for supervising security of a computer architecture, the system comprising, for a first cloud belonging to a plurality of interconnected clouds of the architecture and for the other clouds of the plurality:

a processing unit; and a non-transitory memory comprising code instructions stored thereon, which when executed by the processing unit configure the processing unit to:

receive a security event by a first security controller of the first cloud of the plurality of clouds, wherein each cloud comprises a plurality of resources and a security supervisor, the plurality of resources forming a plurality of resource groups in the cloud that are respectively associated with a security domain, each security domain comprises a security controller supervising the resources of the security domain, a plurality of physical machines comprising resources of the plurality of clouds, wherein the respective security supervisors of the clouds comprise a set of security rules forming a security policy, and wherein said security event originates from a first of the resources associated with a first of the security domains, sending by the first security controller of the first cloud said security event to the security supervisor of the first cloud, sending by the security supervisor of the first cloud a security order to at least a second security controller of the first cloud in reaction to the security event, and sending by the second security controller the security order to a second resource supervised by the second security controller, sending by the security supervisor of the first cloud, information relating to the security event to the security supervisors of the other clouds of the plurality of interconnected clouds, negotiating a second security order between the security supervisor of the first cloud and the security supervisors of the other clouds, the negotiation being based on information relating to the security event and on the respective security policies of the security supervisors, and sending by one of the security supervisors of the other clouds the second security order to at least a third resource, the third resource being included in a cloud of the plurality of interconnected clouds, different from the first cloud.

* * * * *